Aug. 2, 1960    A. R. GRAFF ET AL    2,947,669
ROTARY MALTING EQUIPMENT
Filed Sept. 24, 1956    6 Sheets-Sheet 1
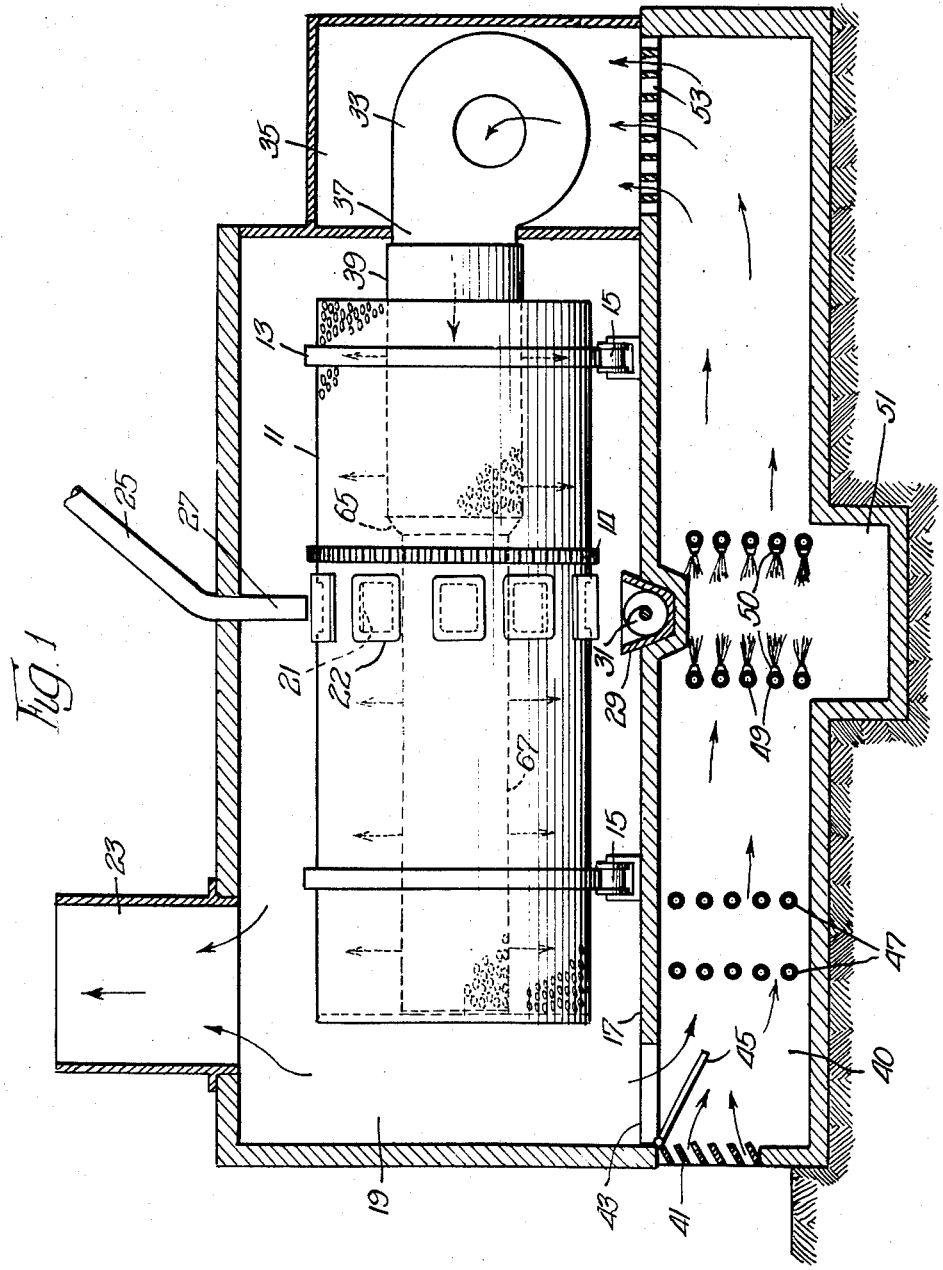
INVENTORS.
Alan R. Graff,
BY Edwin C. Juergens,
Samuel E. Berkenblit Aug. 2, 1960
A. R. GRAFF ET AL
2,947,669
ROTARY MALTING EQUIPMENT
Filed Sept. 24, 1956
6 Sheets-Sheet 2
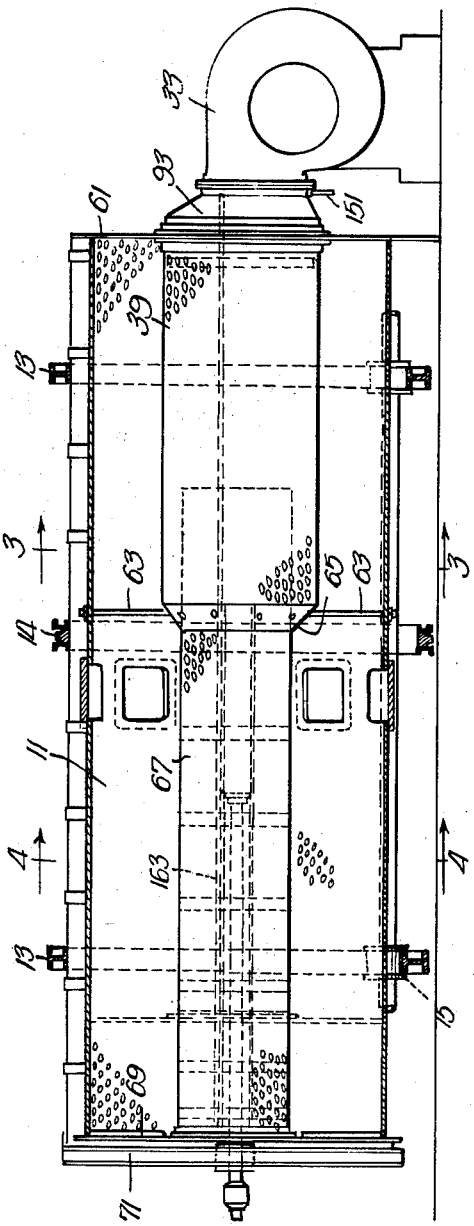
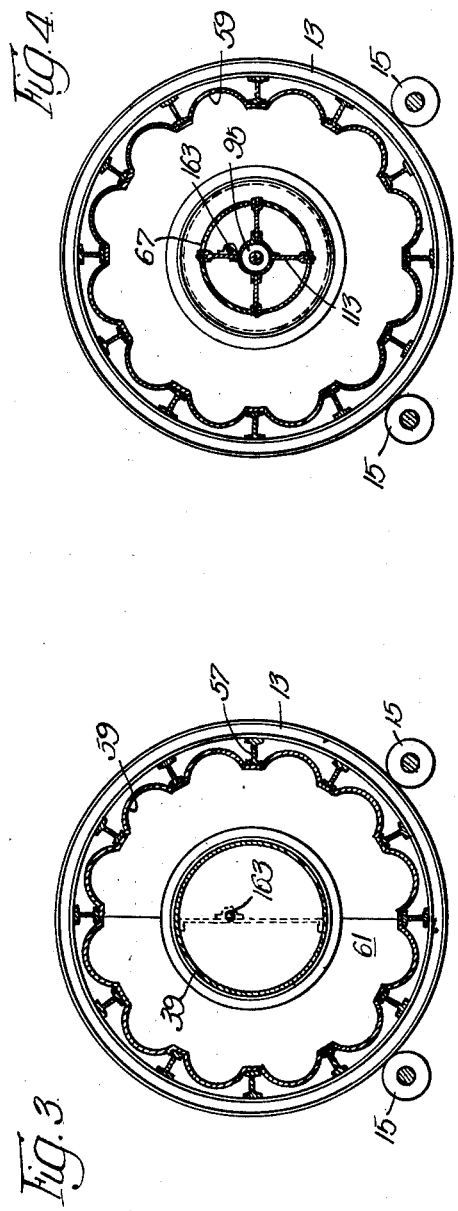
INVENTORS
Alan R. Graff,
Edwin C. Juergens,
BY Samuel E. Berkenblit,

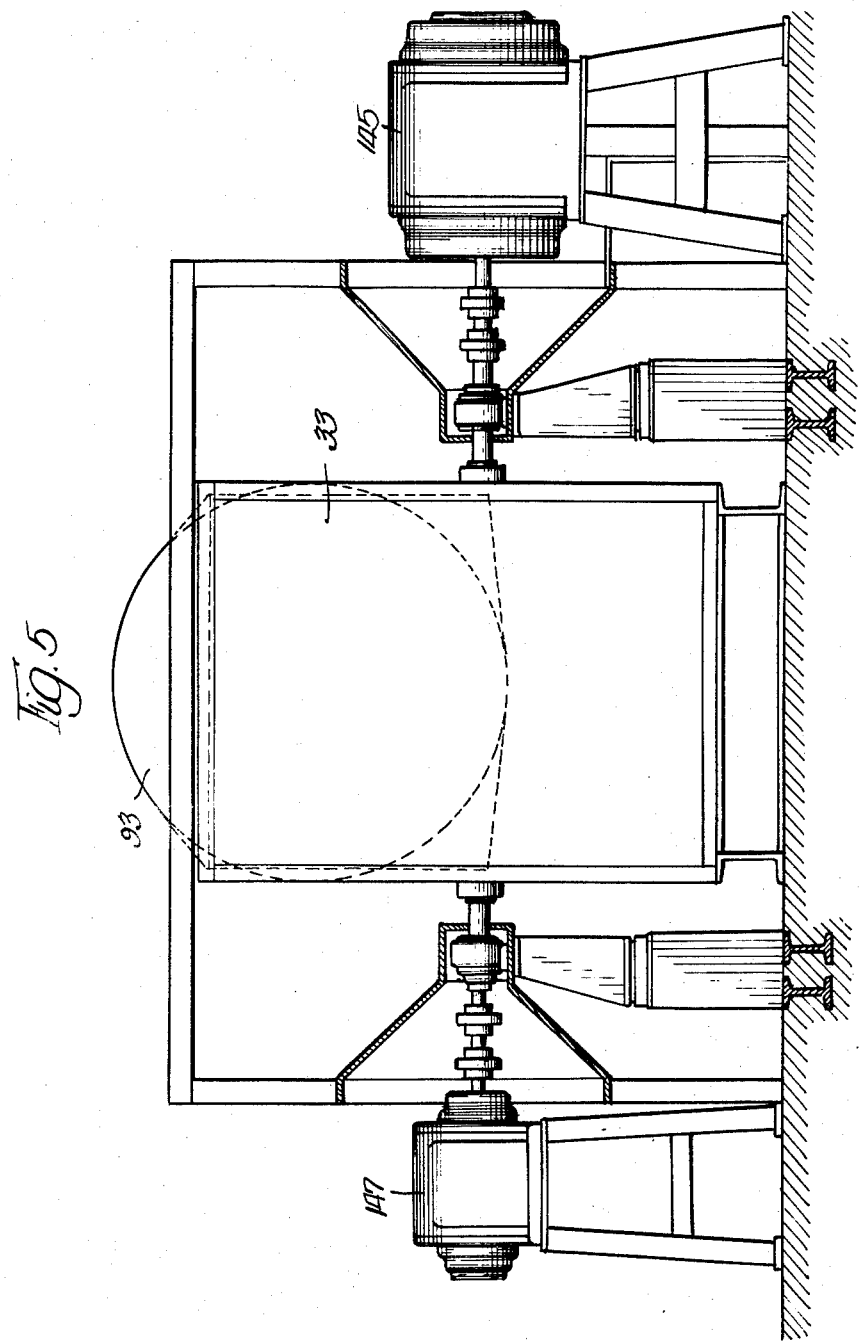

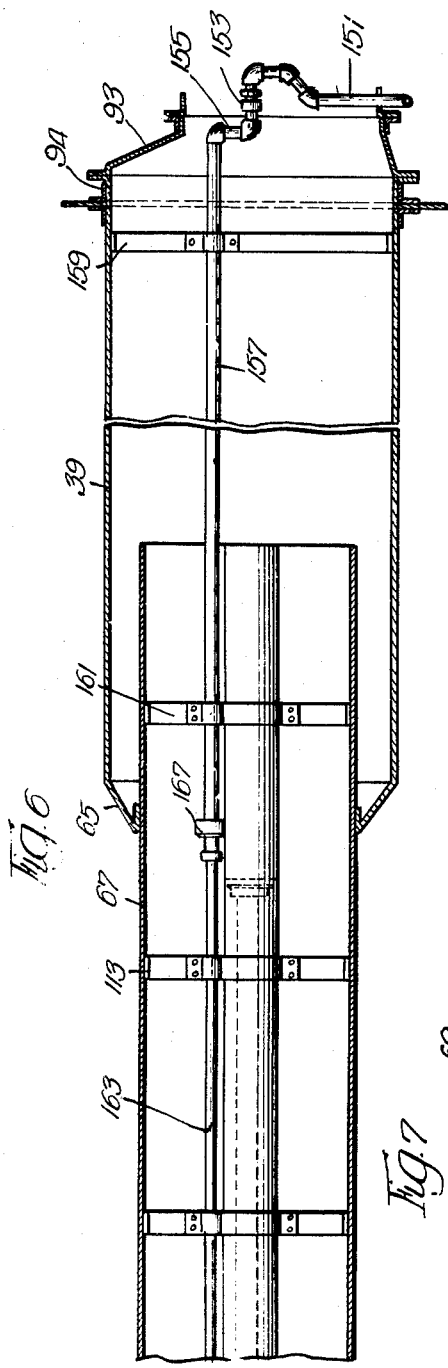

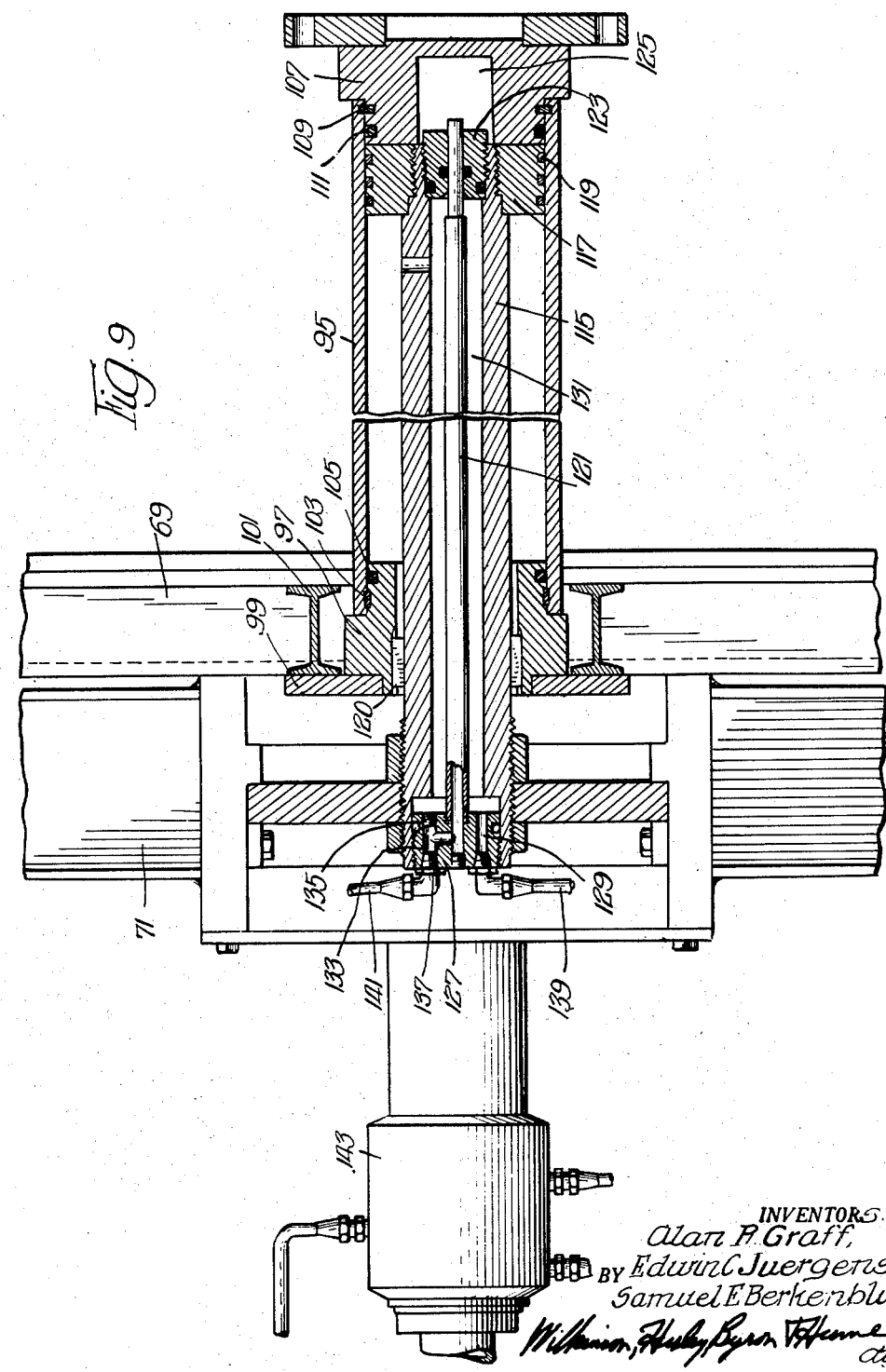

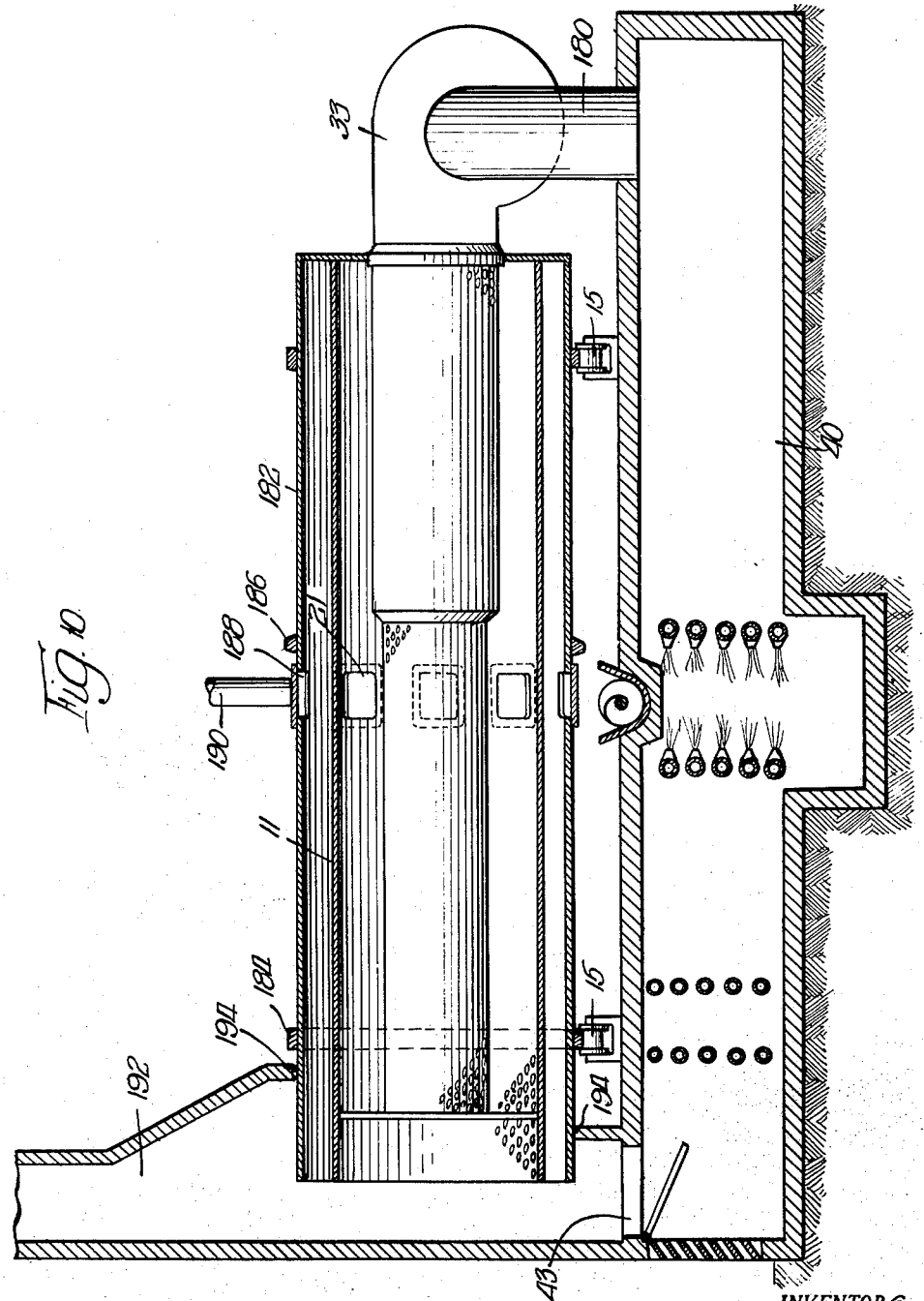

United States Patent Office 2,947,669
Patented Aug. 2, 1960

2,947,669

ROTARY MALTING EQUIPMENT

Alan R. Graff, Flossmoor, and Edwin C. Juergens and Samuel E. Berkenblit, Chicago, Ill., assignor to The Columbia Malting Company, Chicago, Ill., a corporation of Illinois Filed Sept. 24, 1956, Ser. No. 611,571

8 Claims. (Cl. 195—127)

This invention relates to a new and improved horizontal malting apparatus and more particularly to a rotatable, horizontal drum and associated apparatus adapted for carrying out the entire malting operation.

The malting of grain comprises three steps, the steeping of the grain, the germination of the grain and the drying of the malted grain. The steeping requires the controlled additions of large quantities of water to the grain, the germination period requires the maintenance of the grain in moist condition while it is turned or moved to aerate it and prevent matting. The germination is an exothermic reaction and requires the passage of moderate amounts of cool, moist air through the grain to prevent overheating while maintaining the necessary moisture in the grain. The drying of the germinated and malted grain requires the passage of large quantities of heated air through the grain.

It has heretofore been proposed to provide a rotatable malting drum and to pass air through the grain in the drum during the malting operation. In passing such air, however, it is necessary to control the depth of the grain through which the air passes. In addition to other novel features of construction, the present invention provides means for introducing the air centrally of the drum and for adjusting the effective volume of the drum so that the grain presents substantially uniform resistance to passage of air in all directions.

It is an object of the present invention to provide a new and improved rotary malting drum.

It is a further object to provide such a drum including a concentric inner perforated tubular member or cylinder together with connections for directly introducing air into said member.

It is an additional object to provide means for increasing or decreasing the effective length and capacity of the drum and simultaneously increasing or decreasing the effective length of the inner member.

It is also an object to provide a closed chamber for containing the drum, together with related chambers, passages, and apparatus for the cooling, moistening and heating of air and for the introduction of said air directly into the inner member.

It is another object to provide means whereby selected portions of the air or the whole amount of the air may be discharged from the chamber, and when portions only are drawn off, other portions may be recirculated through the inner member after suitable treatment if desired.

It is a further object to provide a rotary malting drum and related air treating and blowing apparatus directly associated therewith, which is economical in space, and construction and operating costs, and is adapted for commercial installation and use.

Other and further objects will appear as the description proceeds.

We have shown certain preferred embodiments of our invention in the accompanying drawings in which—

Figure 1 is a somewhat diagrammatic elevation, partly in section, showing the general layout of the apparatus and related chambers and equipment;

Figure 2 is a vertical longitudinal section through the horizontal drum;

Figure 3 is a section taken on line 3—3 of Figure 2;

Figure 4 is a section taken on line 4—4 of Figure 2;

Figure 5 is a transverse elevation, partly in section, showing the blowing equipment;

Figure 6 is a fragmentary vertical longitudinal section showing the water admission pipes in the drum;

Figure 7 is an end view of the movable partition wall of the drum;

Figure 8 is a view largely in section, on an enlarged scale, of a portion of the water distribution piping;

Figure 9 is a fragmentary elevation, partly in section, showing the movable wall operating cylinder; and Figure 10 is a view similar to Figure 1 but showing a modified form of construction.

Referring first to Figure 1, the rotatable drum 11 is shown as supported on circular rails 13 directly secured to the drum and resting on rollers 15. The rollers 15 are supported on a floor 17. Imperforate walls form a closed chamber 19 enclosing the perforate drum 11. The drum is provided with a plurality of filling and discharging openings 21 which are each provided with a suitable closure member 22. A stack 23 carries exhaust air from chamber 19. Grain to be malted is admitted to chamber 19 through an adjustable chute 25 leading directly to the series of loading openings 21. A conveyor trough 29, with a spiral conveyor 31, is located in the floor 17 below the openings 21 of the drum. A blower 33 is driven by suitable power (not shown in Figure 1) and is located in the suction box or blower chamber 35. This blower 33 has a short discharge passage 37 discharging directly into the inner cylinder 39 which is centrally located in the rotating drum 11.

The horizontal air flue 40 is located below the floor 17 of chamber 19. Air may enter the flue 40 through louvers 41. The floor 17 is provided with an opening 43 and adjacent that opening is a swinging damper 45. This damper 45 may be so positioned as to close opening 43 in which event no air is recirculated from chamber 19 through flue 40. In the partially opened position, shown in Figure 1, a portion of the air will be recirculated while there will be fresh air drawn in through louver 41.

The flue 40 is provided with a plurality of burners 47 which may be supplied with gaseous or liquid fuel to heat the air passing across the burners during the drying stage of the malting operation. A plurality of water pipes 49 are also provided in flue 40. These pipes are provided with a plurality of nozzles 50 to produce a spray of water through which the air will pass. It will be understood that the water spray will not be used concurrently with the burners, but only during that portion of the malting operation which requires a cooling draft of moistened air. A sump 51 is provided below sprays 49 to carry off excess water. The bottom of the fan chamber 35 is provided with a grid 53 which permits the air from the flue 40 to be drawn up to the intake of fan 33.

The rotating drum 11 has been shown more in detail in Figures 2, 3 and 4. The circular rails 13 of the drum surround and are secured to a plurality of evenly spaced, longitudinally extending I-beams 57 which, together with the rails 13, form a massive framework for the drum. Between each pair of beams 57 there is provided a longitudinally extending arcuate plate 59 which is perforated with perforations of such sizes as to permit passage of air, but to prevent passage of the grain to be malted. The drum 11 is supported on a plurality of rollers 15 which are engaged by the rails 13 and is provided with an encircling gear 14 which may be driven to rotate the drum by any suitable means. Spiral interior vanes may be provided, if desired, to move the grain toward the center.

The drum 11 contains an interior tubular member or cylinder 39 which is supported at the right end of the drum, as shown in Figure 2, by a solid wall member 61 closing the space between the outer walls of the drum 11 and the interior cylinder 39. The left or interior end 65 of the tubular member 39 is supported from the frame of the drum 11 by means of a plurality of radial tension rods 63. This end 65 of member 39 is conical in form to meet the outer surface of the sliding interior cylindrical member 67 which is smaller in diameter than member 39. The opposite end of member 67 is supported on a movable partition 69, shown in face view in Figure 7. The members 39 and 67 are both perforated in a manner similar to the outer wall sections 59 of the drum to permit passage of air while preventing passage of grain. The left end of the drum 11 is open, but is cross connected by transverse I-beams 71 which also carry a portion of the partition operating mechanism, as shown in detail in Figure 9. Figure 2 shows the fan 33 connected to the open end of the interior perforated cylinder 39 by a housing member 93 so that the output of the fan is sent directly into the member 39 from which it may pass freely into the movable interior member 65.

The partition 69 is moved longitudinally of the drum 11 by a hydraulic cylinder 95, shown in Figure 9. This cylinder 95 has a head 97 connected by a flange 99 to I-beams 101 which constitute a portion of the framework of the partition 69. The body of the cylinder 95 is connected to the head 97 by splines 103 and an O-ring 105 is provided to prevent the loss of fluid. The opposite end 107 of cylinder 95 is similarly secured to the cylinder body by a spline 109 and a similar O-ring 111 is also provided. The cylinder 95 is supported in the tubular member 67 by means of radial cross braces 113, as shown in Figure 4.

The cylinder head 107 does not transmit the operating thrust directly to the partition 69, but the thrust, when moving the partition inwardly, is transmitted by tension through the body of the cylinder 95. The hollow piston rod 115 extends within cylinder 95 and is threaded into the piston head 117. The piston head 117 is provided with suitable rings 119 to prevent escape of fluid. The cylinder head 97 is provided with suitable packing 120 to prevent leakage of fluid between the cylinder head and the tubular piston rod 115. The fluid supplying pipe 121 extends through the piston rod 115 with its inner end supported in a plug 123 threaded into the piston rod 115, as shown in Figure 9. Also, as shown, suitable O-rings are provided at this point. Tube 121 discharges into a chamber 125 in the piston head 107. The outer end of pipe 121 is screwed into a plug 127 which closes the outer end of the tubular piston rod 115. This plug 127 is provided with a passage 129 leading into the chamber 131 which surrounds the pipe 121 within the piston rod 115. The plug 127 is further provided with a second passage 133, the inner end of which is closed by plug 135. A cross passage 137 connects passage 133 with the interior of the pipe 121.

In the construction as shown, the cylinder 95 rotates with the drum 11 as does the piston rod 115 which is fixedly connected to the cross beams 71 at the open end of drum 11. The fluid pipes 139 and 141 are connected by suitable means to a non-rotating control valve assembly 143.

As shown in Figure 2, the fan 33 is directly connected by housing member 93 and it will be understood that suitable pressure sealing means at 94 of Figure 6 will prevent loss of air between the fixed housing 93 and the drum end 61. The air passes directly into the inner cylinder 39 through its open end. The fan drive and housing are shown in greater detail in Figure 5. Two motors are shown as connected to the fan 33. The right hand motor 145 is larger than the left hand motor 147. It will be understood that only one motor will be used at a time. The amount of air needed during the germination period is much less than is needed during the drying period. As a specific example, with a drum of a size to handle three thousand bushels of grain, the motor 147 may be of fifteen horse power while the motor 145 may be of four hundred horse power. Other known drive means for delivering varying quantities of air may be used.

It is necessary to introduce water into the drum during the steeping and germinating stages of the operation. Pipes for this purpose are shown in Figures 6 and 8. The water inlet pipe 151 leads up through the housing 93 between the fan and the drum. This pipe 151 leads to a rotary connector 153 located on the axis of rotation of the drum 11 and inner cylinder 39. A radial length of pipe 155 connects to the perforated pipe 157 which is fixedly supported at one end on the transverse support 159 in the tubular member 39, and at its other end has a sliding support on a cross support 161 in the inner end of the sliding cylindrical member 67. A smaller perforated pipe 163 with a closed end 165 is supported on the cross braces 113 and its inner end has a sliding, fluid tight fit within the pipe 157 as shown in Figure 8. A collar 167 is threaded on pipe 157 and a flange 169 is bolted to the collar 167 is threaded on pipe 157 and a flange 169 is bolted to the collar 167 and holds the packing 171 in place. It will thus be apparent that water will always be capable of being delivered throughout the effective length of the drum 11 regardless of the position of the movable head 69. The water is sprayed into the inner perforated members 39 and 67 and is distributed to other grain through the perforations.

In the operation of the apparatus before placing the grain in the drum the movable head 69 is moved to an inner position. The drum is then substantially filled with grain so that the inner members 39 and 67 are always surrounded by grain to a substantially uniform depth during the rotation of the drum. It will be apparent that if these perforated members are not substantially uniformly covered, the greater part of the air would pass out the perforations with the thinnest covering and not pass through the entire body of the grain. During the steeping period, the drum is slowly rotated and large quantities of water are supplied. Moist air may also be passed through the grain. During the subsequent germination period, moist cooling air is passed through the grain to carry off heat produced by the germination. During the final drying period, large quantities of dry, heated air are passed through the malted grain.

During both the steeping and the germinating periods the grain increases in volume. Thus the movable partition 69 is moved outwardly from time to time to maintain the desired level of grain at all times over the members 39 and 67. During the drying period, the malted grain decreases in volume and the partition 69 is moved inwardly from time to time for the same purpose. Thus it is possible at all times to maintain a capacity suited to the volume of the material being treated. This assures maximum efficiency in the use of the blower and the proper turning, and working of the grain by the rotation of the drum.

Our construction allows a recirculation of all or part of the air which permits of substantial economy of operation as it is expensive to temper the air and especially to heat it. By controlled recirculation the heat loss through the stack may be greatly reduced. The particular configuration of the cross section of the outer drum with the longitudinally extending concave segments facilitates the turning over of the grain as the drum rotates. No means have been shown for engaging the circular gear 14 to rotate the drum but it will be understood that any well known means for rotating a drum or kiln may be used.

The rotation given to the drum is quite slow as it is only necessary to gradually turn over the grain to properly moisten and aerate the grain and prevent the germinating or drying grain from matting. A too rapid rotation would tend to break up the grain and rootlets, especially during the drying operation.

The drying operation requires a much greater amount of air than do the earlier stages of the process. Therefore, the size of the interior members 39 and 67 are determined by the drying air requirements and the same is true of the blowing fan. These features are important since if the drying stage is too much prolonged the quality of the malt is adversely affected. This is entirely aside from the fact that for practical commercial operation it is necessary to maintain the entire cycle of operation within a reasonable time.

The form of construction shown in Figure 10 differs somewhat in detail from that shown in Figure 1 but is operated in the same manner. The air passage 180 leads directly to the intake of fan 33 from the lower tempering chamber 40. The tempering chamber 40 is the same as that shown in Figure 1 and is provided with the same means for heating or cooling the air. The perforate outer wall 11 of the drum is enclosed within an imperforate outer drum 182. This drum 182 carries the circular rails 184 supported on rollers 15 and also is provided with a drive gear 186. The drum 182 is provided with openings 188 aligned with the openings 21 in the perforate drum 11. Suitable closures are provided for the drum openings. The grain feed chute 190 is movable downwardly through the aligned openings 188 and 21 so that grain may be fed directly to the inner drum. The stack construction 192 is fixed and suitable packing or sealing means is provided where the stack engages the outer surface of the drum 182 at 194. It will be apparent that the construction of Figure 10 is somewhat more compact than that of Figure 1 but operates in the same manner. The air and gases passing outwardly through the perforate drum 11 pass between that drum and the imperforate drum 182 to the stack 192 or may be recirculated through floor opening 43 in the same manner as in the construction of Figure 1.

While we have shown certain preferred embodiments of our apparatus, these are to be understood to be illustrative only as they are capable of variation to meet differing conditions and requirements. We, therefore, contemplate such modifications as come within the spirit and scope of the appended claims.

What is claimed is:

1. A horizontal rotary malting drum, said drum being generally cylindrical in shape, the outer walls of the cylinder being perforate, a tubular perforate member supported centrally of the drum, means for supplying air to the tubular member, means for introducing grain between the drum walls and tubular member, imperforate end wall members in the drum and means for varying the effective length and capacity of the space between the end wall members and simultaneously similarly varying the effective length of the perforate surface of the tubular member.

2. A horizontal rotary malting drum, said drum being generally cylindrical in shape, the outer walls of the cylinder being perforate, said drum having a fixed end wall at one end thereof, said end wall having a central opening therein, a fixed inner tubular perforate member secured to said end wall in communication with said opening, said inner member extending for a portion of the length of the drum, a movable end closure located adjacent the opposite end of the drum, a movable inner tubular perforate member secured at one end to the movable end closure with its other end slidably fitted within the fixed inner member, means for moving the movable end closure and inner perforate member to vary the effective length and capacity of the interior of the drum, and means to supply air to the interior of the inner members.

3. A horizontal rotary malting drum, said drum being generally cylindrical in shape, the outer walls of the cylinder being perforate, said drum having a fixed end wall at one end thereof, said end wall having a central opening therein, a fixed inner tubular perforate member secured to said end wall in communication with said opening, said inner member extending for a portion of the length of the drum, a movable end closure located adjacent the opposite end of the drum, a movable inner tubular perforate member secured at one end to the movable end closure with its other end slidably fitted within the fixed inner member, means for moving the movable end closure and inner perforate member to vary the effective length and capacity of the interior of the drum, means to supply air to the interior of the inner members, the drum being provided with means whereby it may be rotated, and a pipe extending lengthwise of the inner members, said pipe being perforated and connected to means for supplying water thereto.

4. A horizontal rotary malting drum, said drum being generally cylindrical in shape, the outer walls of the cylinder being perforate, said drum having a fixed end wall at one end thereof, said end wall having a central opening therein, a fixed inner tubular perforate member secured to said end wall in communication with said opening, said inner member extending for a portion of the length of the drum, a movable end closure located adjacent the opposite end of the drum, a movable inner tubular perforate member secured at one end to the movable inner closure with its other end slidably fitted within the fixed inner member, a hydraulic cylinder and piston extending within the movable inner member and connected to the adjacent end of the drum for moving the movable end closure and inner perforate member to vary the effective length and capacity of the interior of the drum, and means to supply air to the interior of the inner members.

5. Malting apparatus comprising a horizontal rotary drum having outer perforate cylindrical walls, a perforate inner member of cylindrical shape extending longitudinally of the drum and spaced from the outer walls thereof to form an annular space for containing grain, a pair of spaced end walls connecting the drum with the inner member, both end walls being imperforate with one end wall having an opening receiving and supporting the inner member, imperforate walls forming a drum chamber enclosing the horizontal rotary drum, an air discharge stack leading from the drum chamber, an air chamber adjacent the drum chamber being separated therefrom by one of said imperforate walls and which is common to both the drum and air chambers, a fan in the air chamber, means providing an air passage extending from the discharge of the fan through the said common imperforate wall and connecting directly with the inner member of the drum, means forming an air tempering chamber having communicating relation with the drum chamber and air chamber respectively so as to receive air from the drum chamber and deliver the same to the air chamber, additional means in associated relation with another imperforate wall of the drum chamber for supplying grain to the annular space, and other means for conveying from the drum chamber the grain discharged from the annular space of the drum.

6. Malting apparatus comprising a horizontal rotary drum having outer perforate cylindrical walls, a perforate inner member of cylindrical shape extending longitudinally of the drum and spaced from the outer walls thereof to form an annular space for containing grain, a pair of spaced end walls connecting the drum with the inner member, both end walls being imperforate with one end wall having an opening receiving and supporting the inner member, imperforate walls forming a drum chamber enclosing the horizontal rotary drum, an air discharge stack leading from the drum chamber, an air chamber adjacent the drum chamber being separated therefrom by one of said imperforate walls and which is common to both the drum and air chambers, a fan in the air chamber, means providing an air passage extending from the discharge of the fan through the said common imperforate wall and connecting directly with the inner member of the drum, an air tempering chamber located adjacent the drum chamber and separated therefrom by another imperforate wall which is common to the drum and to the air tempering chambers, said air tempering chamber communicating with the drum chamber and also with the air chamber, adjustable means for restricting and closing the communications between the air tempering chamber and the drum chamber, means within the air tempering chamber for heating and cooling air, additional means for supplying grain to the annular space, and conveyor means for conveying the grain discharged from the annular space of the drum.

7. Malting apparatus comprising a horizontal rotary drum having outer perforate cylindrical walls, a perforate inner member of cylindrical shape extending longitudinally of the drum and spaced from the outer walls thereof to form an annular space for containing grain, a pair of spaced end walls connecting the drum with the inner member, both end walls being imperforate with one end wall having an opening receiving and supporting the inner member, imperforate walls forming a drum chamber enclosing the horizontal rotary drum, an air discharge stack leading from the drum chamber, an air chamber adjacent the drum chamber being separated therefrom by one of said imperforate walls, and which is common to both the drum and air chambers, a fan in the air chamber, means providing an air passage extending from the discharge of the fan through the said common imperforate wall and connecting directly with the inner member of the drum, an air tempering chamber located adjacent the drum chamber and separated therefrom by another imperforate wall, said last mentioned imperforate wall forming the floor of the drum chamber, a passage at one end of the air tempering chamber communicating directly with the air chamber, the drum chamber floor having an opening therein connecting the drum chamber with the air tempering chamber at the end opposite the passage, adjustable means for restricting and closing the opening, said air tempering chamber having a second opening therein for admitting atmospheric air to the chamber, means in the air tempering chamber for heating and for moistening the air flowing through the chamber from the openings to the said passage, additional means for supplying grain to the annular space, and conveyor means for conveying the grain discharged from the annular space of the drum.

8. Malting apparatus comprising a horizontal rotary drum having an annular space for containing grain, said annular space being formed by an outer perforate cylindrical wall and by a perforate inner member of cylindrical shape extending longitudinally of the drum and spaced from the outer wall thereof, a pair of spaced end walls connecting the outer wall of the drum with the inner member, both end walls being imperforate with one end wall having an opening receiving and supporting the inner member, a drum chamber enclosing the drum, an air discharge stack in communicating relation with the drum chamber, a fan located adjacent the end wall having the opening, means providing a horizontal air passage extending from the discharge of the fan and connecting the same directly with the inner member, an air tempering chamber communicating at one end thereof with the drum chamber by means of a discharge opening from the drum chamber and having communicating relation at its other end with the inlet to the fan, adjustable means for restricting and closing the discharge opening, means for supplying atmospheric air to the air tempering chamber, means in the air tempering chamber for heating and for moistening the air flowing through the chamber from the opening to the fan inlet, other means for introducing grain into the annular space provided by the drum, and conveyor means for conveying the grain discharged from the annular space of the drum.

References Cited in the file of this patent

UNITED STATES PATENTS

| | | |
|---|---|---|
| 475,550 | Giesler | May 24, 1892 |
| 504,478 | Meyer | Sept. 5, 1893 |
| 507,536 | Giesler | Oct. 31, 1893 |
| 507,613 | Giesler | Oct. 31, 1893 |
| 643,965 | Knuttel | Feb. 20, 1900 |
| 689,728 | Knuttel | Dec. 24, 1901 |
| 936,011 | Meyer | Oct. 5, 1909 |
| 2,676,140 | Kardos | Apr. 20, 1954 |

FOREIGN PATENTS

| | | |
|---|---|---|
| 28,124 | Great Britain | of 1907 |
| 633,013 | Great Britain | Dec. 5, 1949 |